(12) United States Patent
Kellner

(10) Patent No.: US 6,876,754 B1
(45) Date of Patent: Apr. 5, 2005

(54) SYSTEM AND METHOD FOR VISUAL CHAT

(75) Inventor: Charles Kellner, Fremont, CA (US)

(73) Assignee: Electric Planet, Palo Alto, CA (US)

( * ) Notice: Subject to any disclaimer, the term of this patent is extended or adjusted under 35 U.S.C. 154(b) by 0 days.

(21) Appl. No.: 10/360,850

(22) Filed: Feb. 7, 2003

Related U.S. Application Data

(63) Continuation of application No. 09/386,081, filed on Aug. 30, 1999, now Pat. No. 6,539,099.

(51) Int. Cl.$^7$ .................................................. G06K 9/00
(52) U.S. Cl. ...................................... 382/103; 382/284
(58) Field of Search ............................... 382/103, 107, 382/284, 285, 294, 283; 345/169, 207; 348/14.08, 722; 703/6; 704/2; 434/350

(56) References Cited

U.S. PATENT DOCUMENTS

| | | | | |
|---|---|---|---|---|
| 4,305,131 A | * | 12/1981 | Best .............................. | 345/716 |
| 4,634,384 A | * | 1/1987 | Neves et al. .................... | 434/44 |
| 5,422,653 A | * | 6/1995 | Maguire, Jr. .................... | 345/9 |
| 5,581,702 A | * | 12/1996 | McArdle et al. ............ | 709/204 |
| 5,664,126 A | * | 9/1997 | Hirakawa et al. ............ | 345/751 |
| 5,682,196 A | * | 10/1997 | Freeman ....................... | 725/139 |
| 5,694,163 A | * | 12/1997 | Harrison ....................... | 725/110 |
| 5,696,892 A | * | 12/1997 | Redmann et al. ............ | 345/582 |
| 5,793,365 A | * | 8/1998 | Tang et al. .................. | 345/758 |
| 5,802,294 A | * | 9/1998 | Ludwig et al. .............. | 709/204 |
| 5,828,839 A | * | 10/1998 | Moncreiff ..................... | 709/204 |
| 6,072,496 A | * | 6/2000 | Guenter et al. .............. | 345/419 |
| 6,088,719 A | * | 7/2000 | Murakami .................... | 709/204 |
| 6,173,069 B1 | * | 1/2001 | Daly et al. ................... | 382/118 |
| 6,343,313 B1 | * | 1/2002 | Salesky et al. .............. | 709/204 |
| 6,370,563 B2 | * | 4/2002 | Murakami et al. ........... | 709/205 |
| 6,393,460 B1 | * | 5/2002 | Gruen et al. ................. | 709/204 |

OTHER PUBLICATIONS

Perng et al., "Image Talk: A Real Time Synthetic Talking Head Using One Single Image with Chinese Test–To–Speech Capability", Computer Graphics and Applications, 1998, pp. 140–148.*

Cooperstock Jeremy et al., "Turning Your Video Monitor into a irtual Window", IEEE 1995, pp. 308–310.*

* cited by examiner

Primary Examiner—Yon J. Couso
(74) Attorney, Agent, or Firm—Van Pelt, Yi & James LLP

(57) ABSTRACT

Disclosed is an inventive method for providing visual chat. A character image is read into memory representing a character a user wishes to be for the duration of the visual chat. Continuous frames of video images are then received, typically using video camera, which include image data of a person. The head image of the person is then tracked by the system, and portions of the head image are extracted from the video images. These extracted portions are preferably features of the person in the video image. Finally, the extracted portions of the head image are blended into corresponding areas of the character image, such that the features of the blended character image match the features of the person, and change as the features of the person change.

9 Claims, 16 Drawing Sheets

SYSTEM AND METHOD FOR VISUAL CHAT

This application is a continuation of application Ser. No. 09/386,081, filed on Aug. 30, 1999, now U.S. Pat. No. 6,539,099.

BACKGROUND OF THE INVENTION

The present invention relates to video communication and, more particularly, to a system and method for video chat.

The World Wide Web of the Internet is the most successful distributed application in the history of computing. In the Web environment, client machines effect transactions to Web servers using the Hypertext Transfer Protocol (HTTP), which is a known Application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator) at a client machine involves specification of a link via the URL. In response, the client makes a request to the server identified in the link and receives in return a document formatted according to HTML.

In this environment, a user has many options of how to communicate with others. One option is the use of electronic mail (email). Using email, a user is able to send messages to others users of the Internet anywhere a connection to the Internet can be established. Email generally allows a user to send typed messages and attachments, such as image files, or sound files. However, email does not allow constant interaction between users of the Internet. Similar to sending a letter, a user of email must wait for the intended email recipient to receive the message, compose a response, send the response, and then wait for the response to reach them.

In a step toward increased participant interaction, chat rooms were created. A typical chat room allows participants to type messages, which are received by other participants nearly instantaneously. Although the quickness of this response increases the amount of participant interaction over email, a chat room does not approach the interaction available when using common a device as simple as an ordinary telephone.

A further step toward increased participant interaction is video chat. Prior Art FIG. 1 is an illustration showing a typical computer system 10 suitable for video chat. The system includes a computer processor 12, a monitor 14, a microphone 16, and a camera 18. A user 20 is typically situated in front of the computer system 10. As the user 20 speaks, the microphone 16 detects the user's voice and transmits the sound to the computer processor 12, typically in the form of a digital signal. Simultaneously, the camera 18 transmits video images of the user 20 to the computer processor 12.

The video and audio signals are then transmitted, typically in compressed form, to a recipient's computer, where they are decompressed and viewed/heard. In this manner, two users of the Internet, or any other network, can communicate with one another in a highly interactive environment, wherein each user can both see and hear the person they are communicating with. However, there are problems with conventional video chat.

One problem is the extreme amount of bandwidth required to use video chat effectively. Streaming video, utilized by video chat, uses an extreme amount of bandwidth. Increased bandwidth is required for clearer and smoother video images. Moreover, since the requirement on bandwidth is so high, a typical home computer system generally cannot handle more than a two-way video chat session. Each additional video chat participant greatly increases the amount of required bandwidth. Thus, having more than two video chat participants using typical home computer systems generally drains system resources such that the systems are unable to perform desirably.

Another problem with video chat is the loss of anonymity among participants. Using email, or non-video chat, participants are able to remain more or less anonymous, since participants cannot actually see each other. Video chat, on the other hand, allows participants to visually identify one another. This may cause problems, especially with children, when strangers are essentially allowed to "look" into the homes of other users.

In view of the forgoing, what is needed are improved methods and systems for providing video chat at a reduced bandwidth, thus allowing multiple participants on a typical home computer system. Further, there is a need for methods and systems for allowing anonymity during video chat, thus allowing users to enjoy the highly interactive nature of video chat without being visually identified by strangers.

SUMMARY OF THE INVENTION

The present invention addresses these needs by providing an improved visual chat method. In one embodiment, a character image is read into memory representing a character a user wishes to be for the duration of the visual chat. Continuous frames of video images are then received, typically using a video camera, which include image data of a person. The head image of the person is then tracked by the system, and portions of the head image are extracted from the video images. These extracted portions are preferably features of the person in the video image. Finally, the extracted portions of the head image are blended into corresponding areas of the character image, such that the features of the blended character image match the features of the person, and change as the features of the person change.

In another embodiment, a computer system is disclosed for providing visual chat. The system includes a computer processor, memory for storing character images, a camera, and logic for performing visual chat operations. In use, the camera transmits video images of a person to the computer processor. Thereafter, the logic performs visual chat operations including tracking a head portion of a person, obtaining a portion of the person image from the head portion, and blending the obtained portion of the head image into the character image.

A computer program for providing visual chat is disclosed in yet another embodiment of the present invention. The computer program includes a character input code segment that reads a character image into memory representing a character a person wishes to be for the duration of the visual chat, and a video code segment that receives video images of the person. The computer program also includes a tracking code segment that tracks a head portion of the person, after which a gathering code segment obtains portions of the head portion from the person's image. These extracted portions are preferably features of the person in the video image. Finally, the extracted portions of the head image are blended into corresponding areas of the character image by a blending code segment. Preferably, the blending is performed such that the features of the blended character image match the features of the person, and change as the features of the person change.

Advantageously, the present invention allows users to be other "characters" for the duration of the video chat session. Moreover, the character obtains the same features as the user, in a manner similar to the look achieved by having a makeup artist, using prosthetics and makeup, disguise the user as the character. The character actually "looks" like the user might "look" if the user actually was the character, i.e., the blended character has essentially the same features as the user, and blinks and smiles as the user does. Moreover, the present invention allows visual chat at a reduced bandwidth, thus allowing many individuals to participate in the same video chat session.

BRIEF DESCRIPTION OF THE DRAWINGS

Prior Art

DETAILED DESCRIPTION OF THE INVENTION

Figure 1:
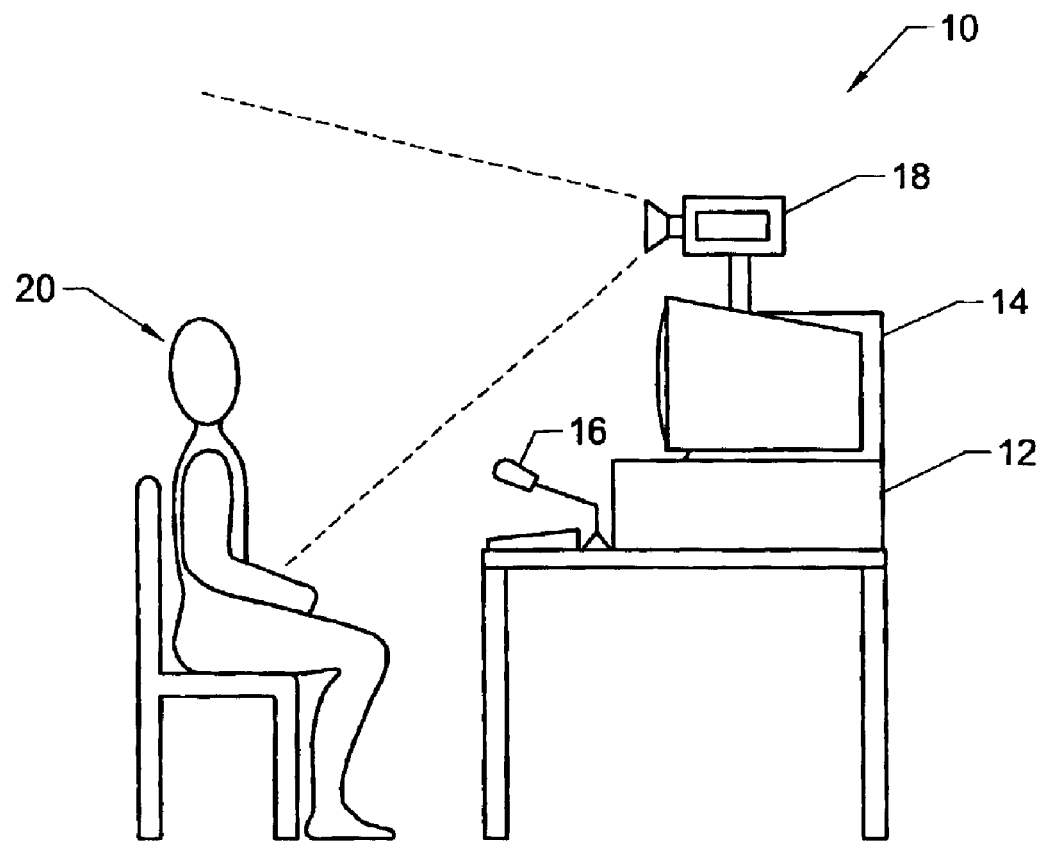
FIG. 1 is an illustration showing a typical prior art computer system suitable for video chat.

FIG. 1 was described in terms of the prior art. A preferred embodiment of the present invention will now be described with reference to FIG. 2. In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 2:
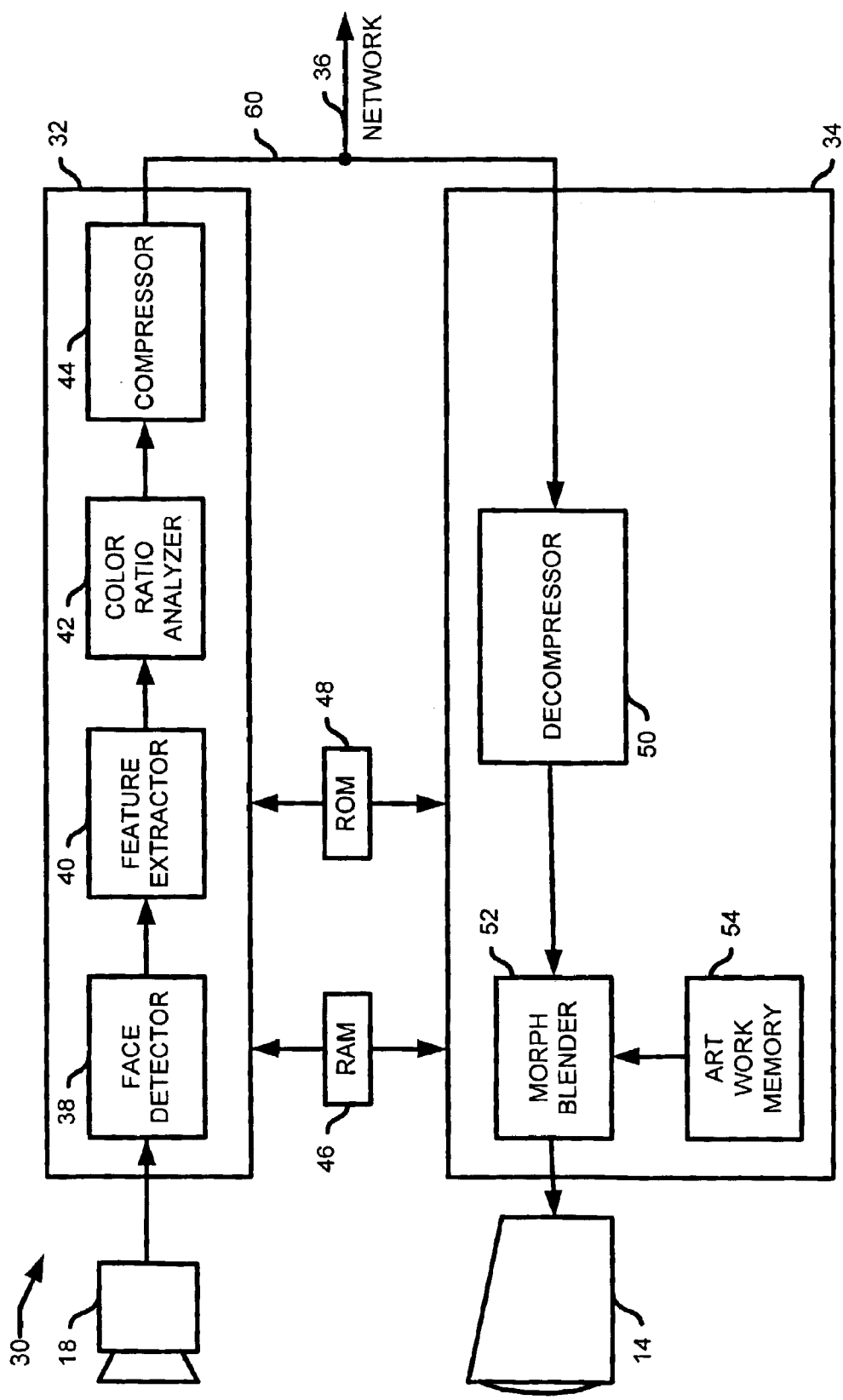
FIG. 2 is an illustration showing a system configuration for visual chat, in accordance with an embodiment of the present invention.

FIG. 2 is an illustration showing a system configuration 30 for visual chat, in accordance with an embodiment of the present invention. The system 30 comprises an encoding system 32, a decoding system 34, and an optional network connection 36. The encoding system 32 includes a camera 18, a face detector 38, a feature extractor 40, a color ratio analyzer 42, and an optional compressor 44. Also included in the encoding system 32 are Random Access Memory (RAM) 46, and Read Only Memory (ROM) 48.

The decoding system 34 includes an optional decompressor 50, a morph Blender 52, artwork memory 54, and monitor 14. The encoder system 32 and decoding system 34 are connected through connection 60.

In use, a user is typically located in front of camera 18, as shown in Prior Art FIG. 1. Referring back to FIG. 2, images of the user are received by camera 18 and transmitted to the face detector 38. The face detector 38 then tracks a head portion of the user located within the received video images. In addition, the face detector 38 tracks the face of the user, and determines feature locations, such as the eyes and mouth, of the user. In this manner, the locations of the users features are essentially always known by the encoding system 32, even when the user's head and face move about within the video images. Accurate locations of the user's features are preferably maintained for the duration of the visual chat to enable accurate blending of the user's features into a character image, described subsequently.

After tracking the head of the user and determining the location of the user's features, the feature extractor 40 uses the feature location information to extract images of the user's features from the video images. Preferably, the feature extractor 40 extracts images of the user's eyes and mouth from the video images. In addition, the feature extractor 40 preferably processes the extracted images to enhance their blendablility, as described in more detail subsequently.

The color ratio analyzer 42 then analyzes the extracted features and generates color ratios for the extracted feature. The color ratios represent the relative brightness and/or darkness of pixels with the extracted feature relative to an average flesh tone of the extracted feature. Compressor 44 then optionally compresses the feature color ratios. Generally, when visual chat is used with a computer network, the feature color ratios are preferably compressed in order to reduce the bandwidth requirement of the system 30. Much higher compression is attainable by compressing only the feature color ratios, rather the extracted images themselves. Thus, rather than sending image pixel data to the receiving computer, the present invention transmits only the feature color ratios. However, the present invention may be utilized on only one computer system, for example, to see a user's features on various character images. In this case, feature color ratio compression would not be necessary, as will be apparent to those skilled in the art.

After compression, decompressor 50 receives the compressed feature color ratios and decompresses the feature color ratios. Typically, the compressed feature color ratios are transmitted over network 36, however, as stated above the present invention may be utilized on one computer system. In this case, the decompressor 50 may be bypassed if the feature color ratios were not compressed. It should be borne in mind that both the encoder system 32 and decoder system 34 interact with each other, and with the encoder and decoder systems of other computer systems. During normal visual chat, information transmitted by the encoder system 32 is transmitted to both decoder system 34 through connection 60, and to a decoder system of another computer system through network connection 36.

After decompression, the morph blender 52 receives the decompressed feature color ratio information. In addition, the morph blender 52 receives character image artwork from the artwork memory 54. The morph blender 52 then alters pixels of character image utilizing the feature color ratio information. In this manner, the features of the user's image are blended into the character image. Using this technique, textures of the character image are generally maintained while still having features of the user's image blended into the character image. The decompressed image is displayed on the monitor 14. In addition, the system may have a microphone which for transmitting the users voice as audio data. As will be apparent to those skilled in the art, the audio data may be transformed as appropriate, to suit the selected character.

Figure 3:
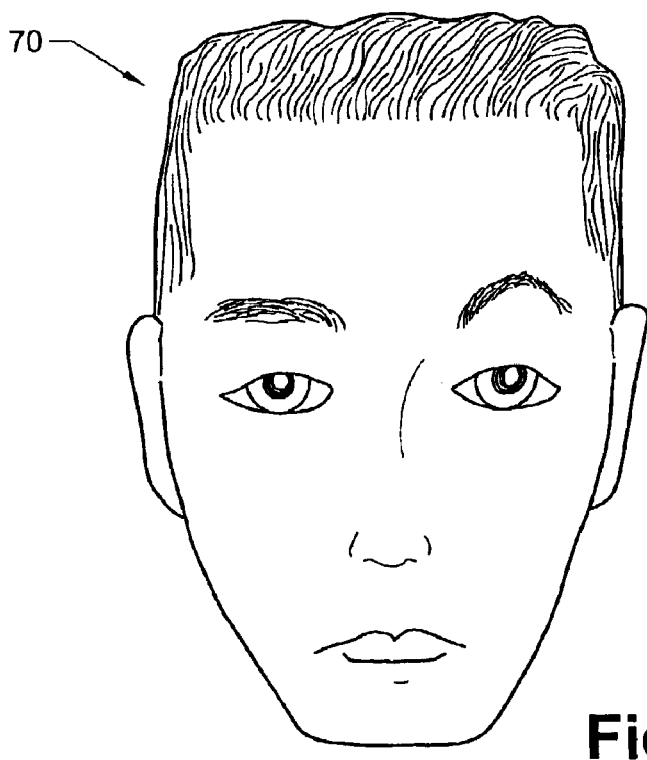
FIG. 3 is an illustration showing an image of a user's face, in accordance with one embodiment of the present invention.
Figure 4:
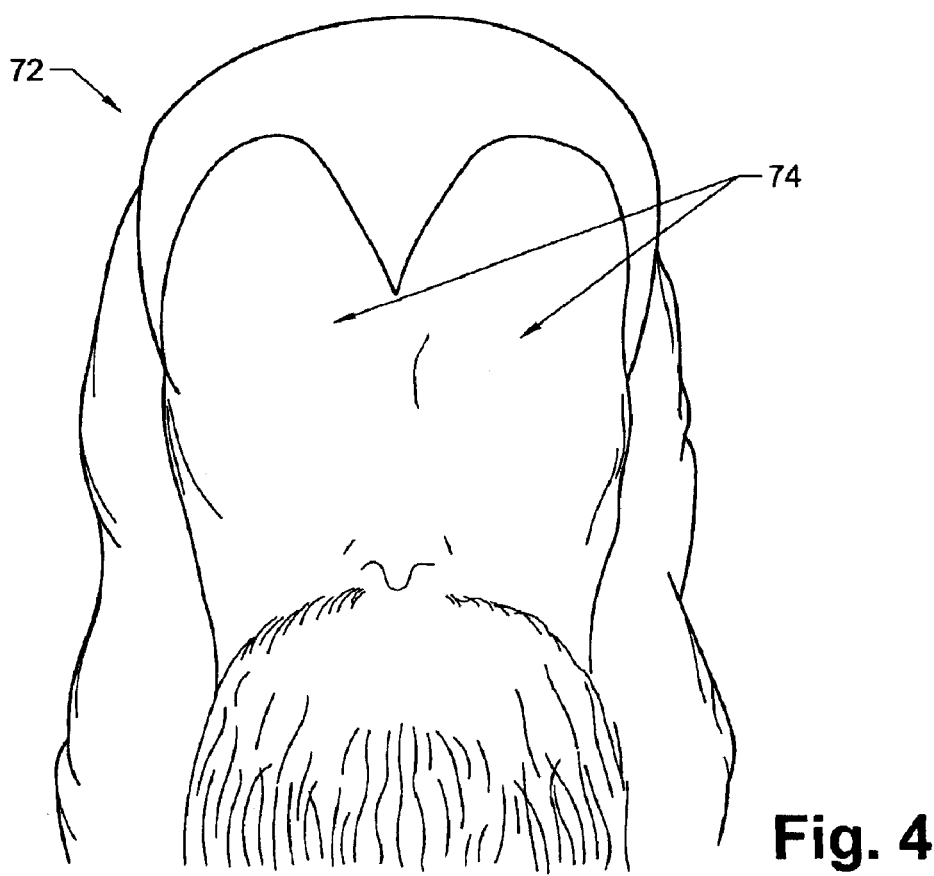
FIG. 4 is an illustration showing a character image, in accordance with another embodiment of the present invention.

FIG. 3 is an illustration showing an image 70 of a user's face, in accordance with one embodiment of the present invention. As stated above, the present invention tracks the user's face in order to determine the feature locations within the image. The system also includes at least one character image 72, as shown in FIG. 4. The character image 72 preferably includes blended out character feature locations 74, such as the eyes and mouth. In this manner, the features of the user's image 70 can be blended into the character image 72 at the locations of the blended out character features locations 74.

Figure 5:
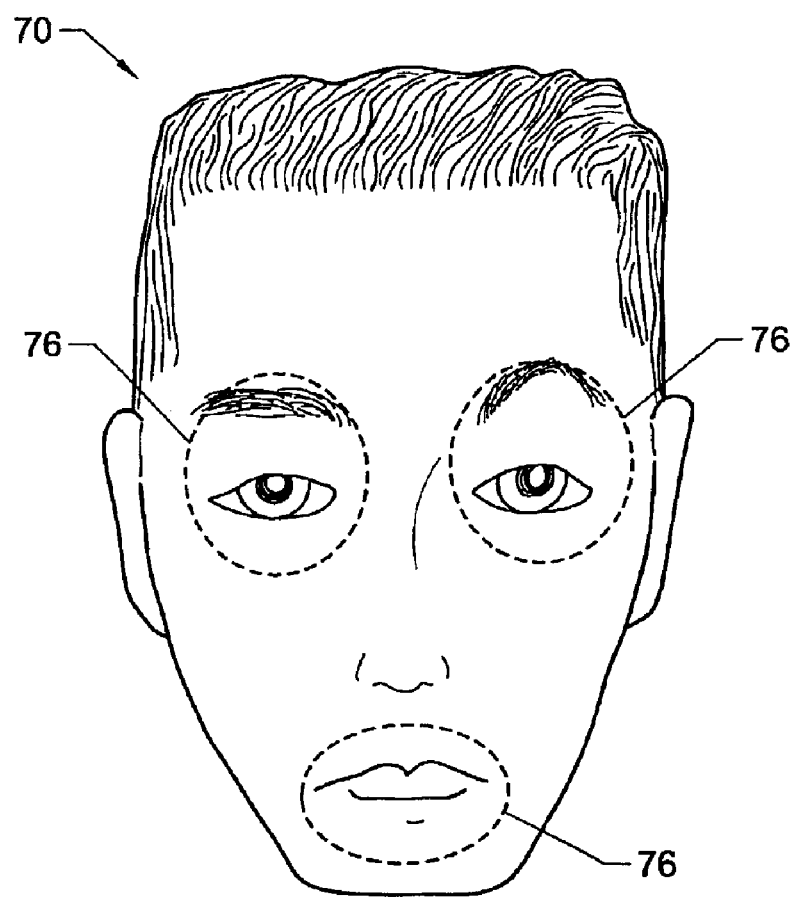
FIG. 5 is an illustration showing an image of a user's face including feature locations, in accordance with an embodiment of the present invention.

FIG. 5 is an illustration showing an image 70 of a user's face including feature locations 76, in accordance with an embodiment of the present-invention. Once the user's face has been tracked, the location of the user's features 76 is known by the system. The system then samples these feature locations in a radius centered on each feature location 76. Preferably, the feature locations 76 include the eyes and mouth of the user's image.

Figure 6:
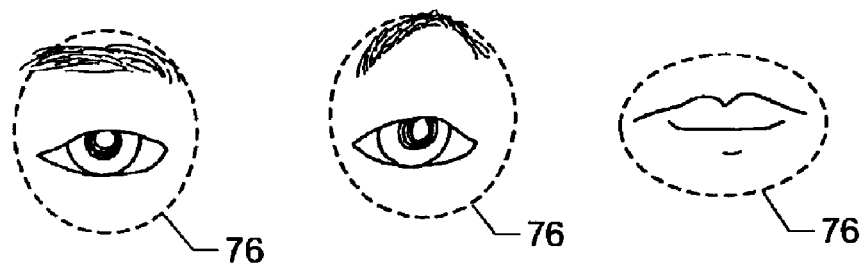
FIG. 6 is an illustration showing sampled feature locations, in accordance with an embodiment of the present invention.

FIG. 6 is an illustration showing the sampled feature locations 76, in accordance with an embodiment of the present invention. Once the sampled feature locations 76 are obtained, the system transmits processed information concerning the sampled feature locations to the decoder systems of other visual chat users. Thus, rather than transmitting the entire video image to other users, only data concerning the sampled feature locations is transmitted to other users. This results in an extreme reduction in required bandwidth for the system, in many cases, as much as a 20:1 reduction in required bandwidth.

Figure 7:
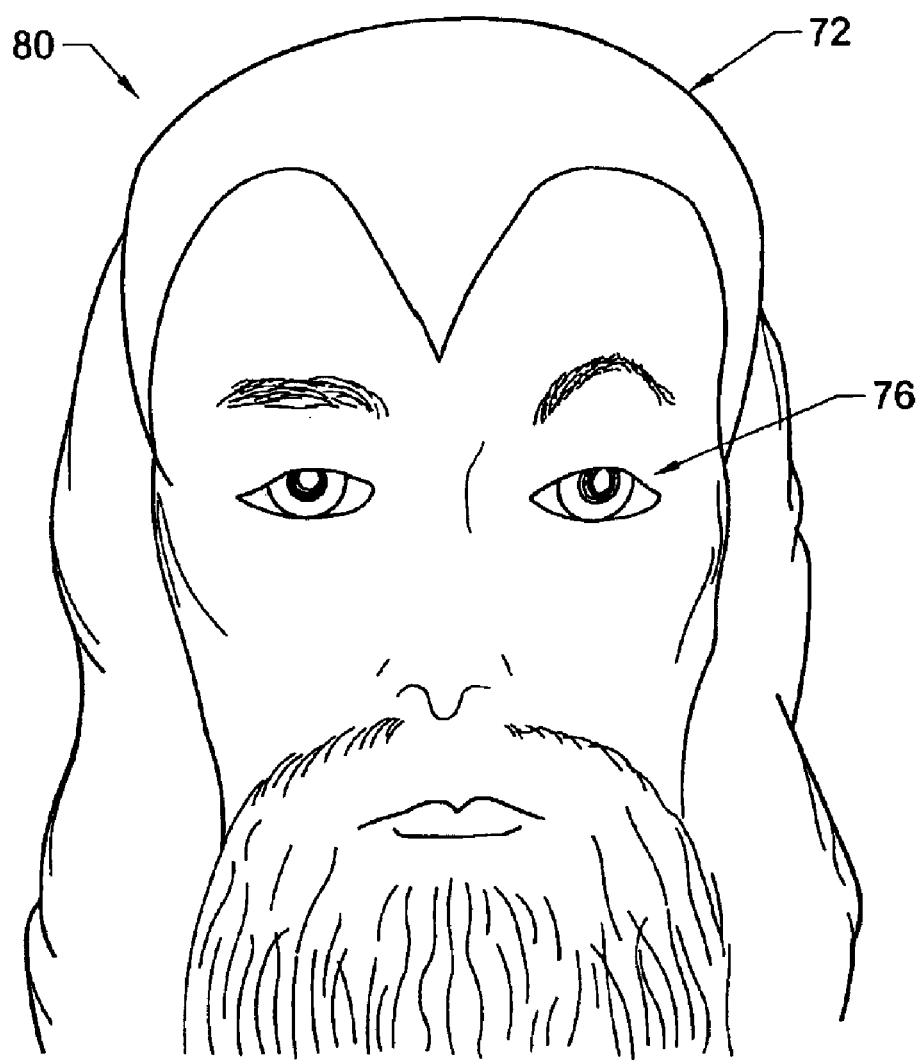
FIG. 7 is an illustration showing a blended character image, in accordance with another embodiment of the present invention.

FIG. 7 is an illustration showing a blended character image 80, in accordance with another embodiment of the present invention. The blended character image includes the artwork of the original character image 72, and the sampled feature locations 76, blended into the character image. As shown in FIG. 7, the feature locations 76 are blended into the character image, such that the features of the blended character image 80 essentially match the user's features. By blending the user's features into the character image 72, the blended character image 80 essentially maintains textures located in the same are as the blended sampled features 76. In should be borne in mind that the sampled features 76 are continuously updated as video information is sent to the system by the system camera. Thus, the effect obtained is similar to the effected obtained if one were looking at a video of only the user's features, such as their eyes. Thus, the features 76 change as the user blinks, talks, smiles, etc. To accomplish a smooth blending effect, the sampled features are preferably processed, as described in detail subsequently.

Figure 8:
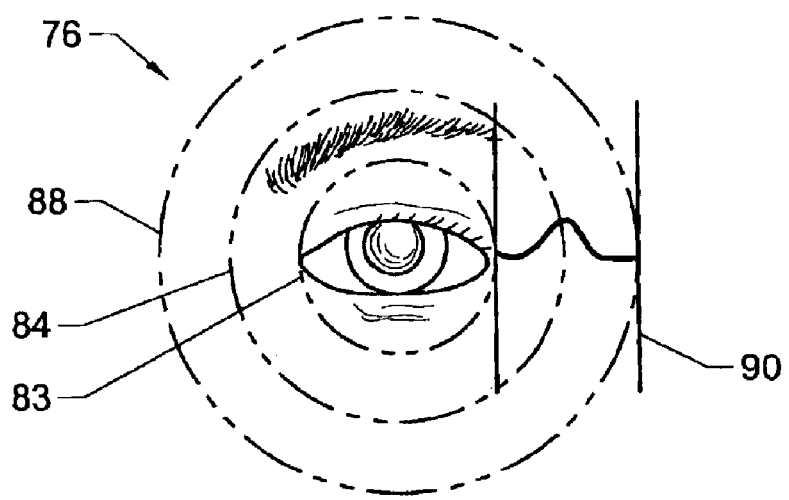
FIG. 8 is an illustration showing a sampled feature location, in accordance with an embodiment of the present invention.

FIG. 8 is an illustration showing a sampled feature location 76, in accordance with an embodiment of the present invention. The sample feature location 76 includes an inner area 82, a middle area 84, and an outer area 88. After sampling, the sample feature location 76 is processed by a "feathering" technique, such that the inner area 82 remains opaque and the outer area 88 becomes near transparent. Feathering produces a smooth transition from the opaqueness of the inner area 82 to the outer area 88, as will be apparent to those skilled in the art.

After feathering, an average flesh tone is determined for the sample feature location 76. The average flesh tone is preferably determined using a sampling zone 90. The sampling zone 90 includes the middle area 84 and the outer area 88 of the sample feature location 76. Preferably, extreme areas within the sample zone 90 are ignored when determining the average flesh tone. Extreme areas include areas of extreme darkness such as the eyebrows. There are various techniques to determine the average flesh tone of a sample feature location 76, as will be apparent to those skilled in the art.

Each sample feature location 76 includes a plurality of pixels, termed "person pixels." Each person pixel includes three color channels, red, green, and blue, as will be apparent to those skilled in the art. For blending purposes, each color channel of each person pixel is compared to a corresponding color channel of the average flesh tone.

Figure 9:
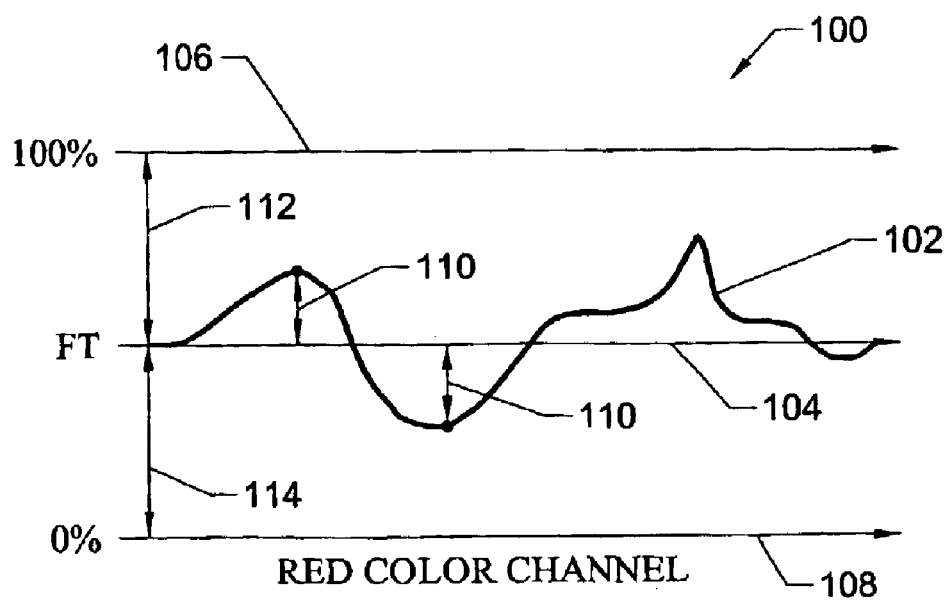
FIG. 9 is a graph showing the red color channel values for individual person pixels and their relation to the red color channel of the average flesh tone, in accordance with an embodiment of the present invention.

FIG. 9 is a graph 100 showing red color channel values for individual person pixels 102 and their relation to the red color channel of the average flesh tone 104, in accordance with an embodiment of the present invention. The graph 100 includes a saturation value 106 and a null value 108. The saturation value 106 is the value of the color channel at 100%, and the null vale 108 is the value of the channel at 0%. A feature color ratio is determined for each channel value of each person pixel. The determination of a feature color ratio depends on whether the color channel value for person pixel is greater than or less than the corresponding color channel value for the average flesh tone.

For color channel values of person pixels 102 greater than or equal to the corresponding color channel value of the average flesh tone 104, a person pixel delta 110 is compared to a lightening flesh tone delta 112. The person pixel delta 110 is the difference between the color channel value for the person pixel 102, and the color channel value for the average flesh tone 104. The lightening flesh tone delta 112 is the difference between the saturation value of the color channel 106, and the color channel value for the average flesh tone 104. Thus, the feature color ratio for lighter person pixels is:

person pixel delta 110:lightening flesh tone delta 112.

For color channel values of person pixels 102 less than the corresponding color channel value of the average flesh tone 104, the person pixel delta 110 is compared to a darkening flesh tone delta 114. The darkening flesh tone delta 114 is the color channel value of the average flesh tone 104. Thus, the feature color ratio for darker person pixels is:

person pixel delta 110:darkening flesh tone delta 114.

Note, the person pixel delta 110 are positive for color channel values of person pixels greater than the color channel value for the average flesh tone, and negative for color channel values of person pixels less than the color channel value for the average flesh tone. Thus, the corresponding feature color ratios are positive for color channel values greater than the color channel value for the average flesh tone, and negative for color channel values of person pixels less than the color channel value for the average flesh tone. In addition, feature color ratios are preferably determined for each person pixel, for each of the three color channels. Thus, similar to the red color channel of FIG. 9, feature color ratios are determined for the blue color channel, and green color channel.

Figure 10:
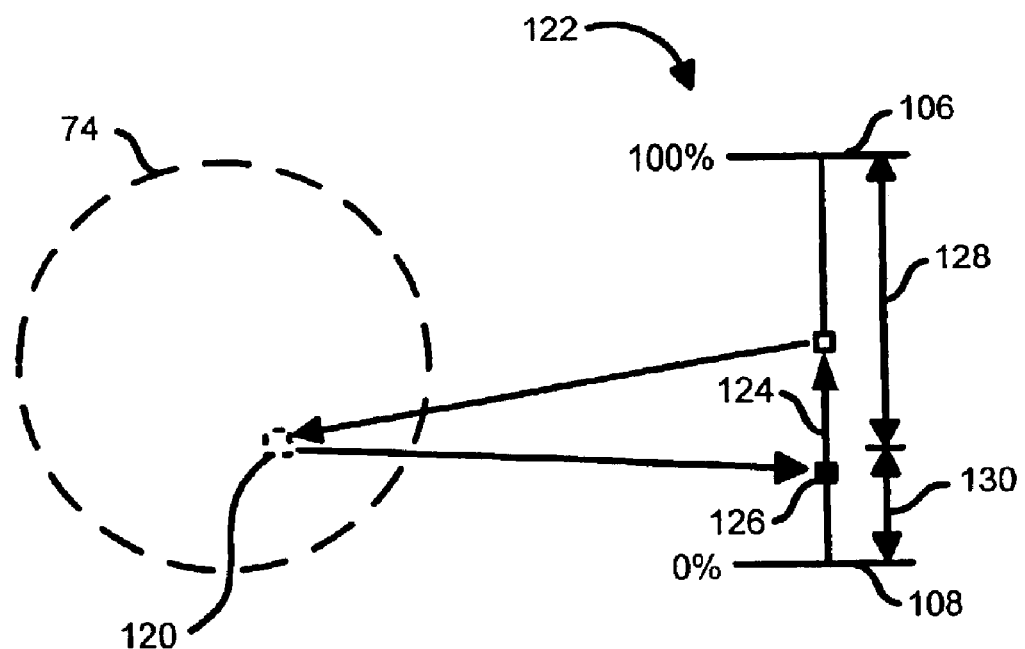
FIG. 10 is an illustration showing a modification of a character feature location, in accordance with another embodiment of the present invention.

FIG. 10 is an illustration showing a modification of a character feature location 74, in accordance with another embodiment of the present invention. The character feature location 74 includes individual character pixels 120. Each character pixel 120 includes three color channels, red, green, and blue, as will be apparent to those skilled in the art. For blending purposes, each color channel of each character pixel is modified using the corresponding color channel feature color ratio of a to corresponding person pixel.

Also shown in FIG. 10 is a graph 122 showing of the red color channel. As in FIG. 9, the graph includes the saturation value 106 and the null value 108 for the red color channel. A feature color delta 124 is determined for each channel value 126 of each character pixel 120. The determination of a feature color delta 124 depends on whether the feature color ratio for the corresponding person pixel is positive or negative.

For positive feature color ratios, a lightening character pixel delta 128 is multiplied by the feature color ratio. The lightening character pixel delta 128 is the difference between the saturation value of the color channel 106, and the color channel value 126 for the character pixel. Thus, the feature color delta 124 is:

(lightening character pixel delta 128)×feature color ratio.

For negative feature color ratios, a darkening character pixel delta 130 is multiplied by the feature color ratio. The darkening character pixel delta 128 is the color channel value 126 for the character pixel. Thus, the feature color delta 124 is:

(darkening character pixel delta 130)×feature color ratio.

Note, the feature color delta 124 is positive for positive feature color ratios, and negative for negative feature color ratios. In addition, feature color deltas are preferably determined for each character pixel, for each of the three color channels. Thus, similar to the red color channel of FIG. 10, feature color deltas are determined for the blue color channel, and green color channel.

The feature color delta is then added to the color channel value 126 of the character pixel. It should be borne in mind that for negative feature color deltas the color channel value is reduced. This is repeated for each of the three color channel values for each character pixel 120.

Figure 11:
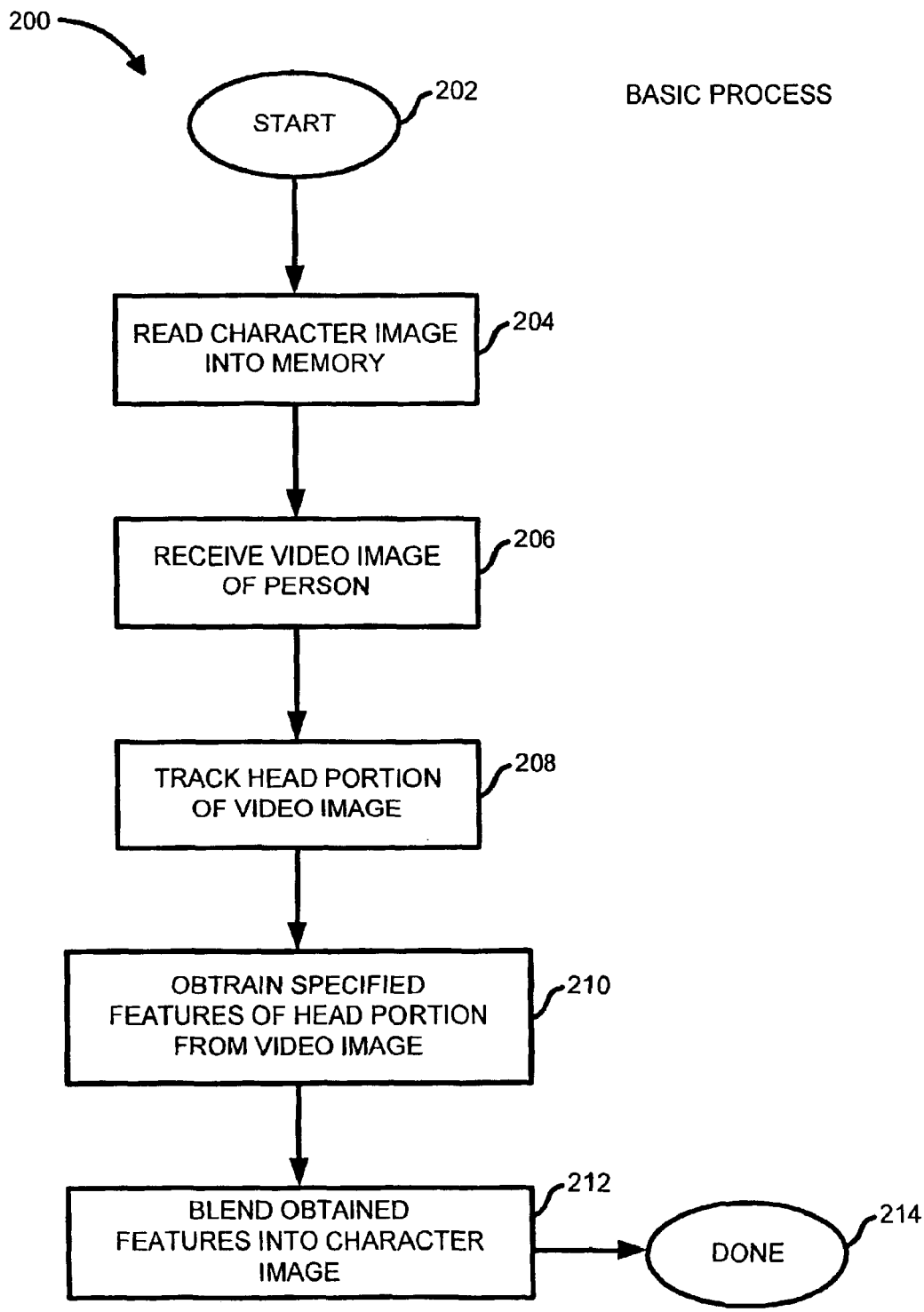
FIG. 11 is a flowchart showing a method for providing visual chat, in accordance with one embodiment of the present invention.

FIG. 11 is a flowchart showing a method 200 for providing visual chat, in accordance with one embodiment of the present invention. In an initial operation 202, pre-process operations are performed. Pre-process operations include initializing the video camera connection, and establishing a visual chat connection.

In a character reading operation 204, a character image is read into memory. A user preferably selects the character image from a plurality of character images. A character image preferably represents some type of face. However, the character image may represent any image that the user wishes to represent them in the visual chat session.

Next in a video receiving operation 206, video images of the user are received by the system. Typically, the video images are obtained using a camera mounted near the user's computer. Generally, the video images include the face of the user, and preferably the user's face is the dominant focus of the video images.

A head portion of the video images is then tracked in a head tracking operation 208. Preferably, the face of the user is tracked in addition to the head of the user. By tracking the face of the user, the system is able to determine the location of the user's features within the video images. Careful tracking of the user's features is an important component in creating a smooth blending of the user's features into the character image.

After tracking the features of the user, features of the user are obtained from the video images in a feature obtaining operation 210. Preferably, an area surrounding each of the user's eyes and the user's mouth is obtained from the video images. This area may then be "feathered" to enhance the blendability of the feature location, as described above. By reducing the video images to only the feature locations, the present invention reduces the required bandwidth of the visual chat 20:1 over conventional visual chat applications. Moreover, information concerning the user's features is typically transmitted to another visual chat user, and then blended into a character image.

Next, in a blending operation 212, the obtained features are blended into the character image. In this manner, the features of the user are blended into the features of the character image, resulting in a character image that mimics the user. Moreover, textures on the character image are retained while still allowing the user's features to be blended into the character image.

Finally, in operation 214, the character image is used to represent the user in the visual chat session. Because of the reduced bandwidth required by the present invention, multiple users may be involved in the same visual chat session essentially without causing unreasonable system resource problems. Moreover, the use of a character image to represent the user allows the user to retain most of anonymity available in text based chat sessions.

Figure 12:
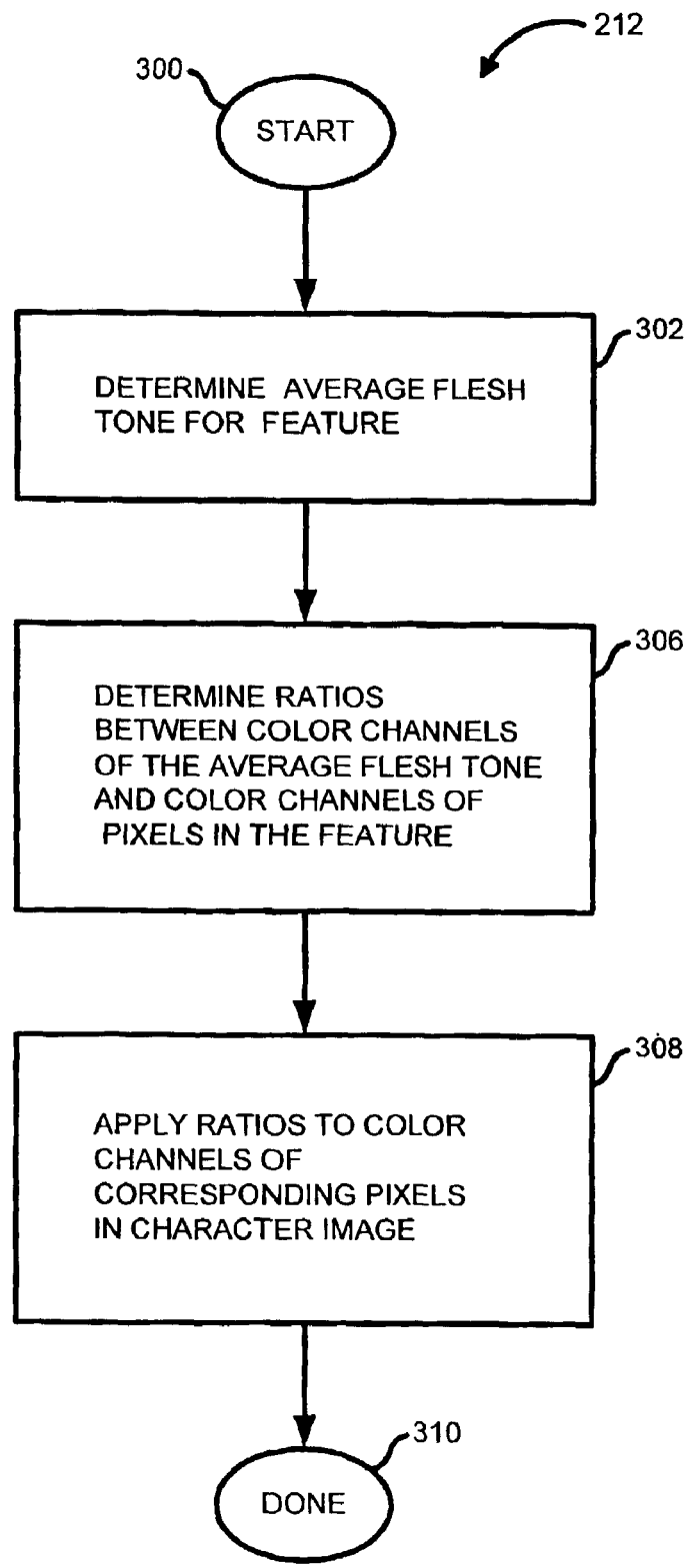
FIG. 12 is a flowchart showing a method for blending the user's features into the character image, in accordance with one embodiment of the present invention.

Referring next to FIG. 12, a method 212 for blending the user's features into the character image is shown, in accordance with one embodiment of the present invention. In an initial operation 300, an image of a feature is obtained from the user's video image. Preferably, this is accomplished by tracking the user's face to determine the location of the eyes and mouth of the user.

In an averaging operation 302, the average flesh tone for the feature is determined. Preferably the feature image is feathered around the edges to increase blendability. After feathering, the average flesh tone for the feature is determined. Preferably, extreme areas within the feature image are ignored when determining the average flesh tone. Extreme areas include areas of extreme darkness, such as the eyebrows. There are various techniques to determine the average flesh tone of a feature image, as will be apparent to those skilled in the art.

Next, in color ratio operation 306, color ratios for are determined for the feature image. Each feature image includes a plurality of pixels, termed "person pixels." Each person pixel includes three color channels, red, green, and blue, as will be apparent to those skilled in the art. For blending purposes, each color channel of each person pixel is compared to a corresponding color channel of the average flesh tone. Moreover, the determination of a feature color ratio depends on whether the color channel value for a person pixel is greater than or less than the corresponding color channel value for the average flesh tone.

For color channel values of person pixels greater than or equal to the corresponding color channel value of the average flesh tone, a person pixel delta is compared to a lightening flesh tone delta. The person pixel delta is the difference between the color channel value for the person pixel, and the color channel value for the average flesh tone. The lightening flesh tone delta is the difference between the saturation value of the color channel, and the color channel value for the average flesh tone. Thus, the feature color ratio for lighter person pixels is:

person pixel delta:lightening flesh tone delta.

For color channel values of person pixels less than the corresponding color channel value of the average flesh tone, the person pixel delta is compared to a darkening flesh tone delta. The darkening flesh tone delta is the color channel value of the average flesh tone. Thus, the feature color ratio for darker person pixels is:

person pixel delta:darkening flesh tone delta.

Note, the person pixel delta are positive for color channel values of person pixels greater than the color channel value for the average flesh tone, and negative for color channel values of person pixels less than the color channel value for the average flesh tone. Thus, the corresponding feature color ratios are positive for color channel values greater than the color channel value for the average flesh tone, and negative for color channel values of person pixels less than the color channel value for the average flesh tone. In addition, feature color ratios are preferably determined for each person pixel, for each of the three color channels. Thus, feature color ratios are determined the red color channel, the blue color channel, and green color channel.

In a character blending operation 308, the color ratios are used to blend the user's features into the character image at the character feature locations. Each character feature location includes individual character pixels. Each character pixel includes three color channels, red, green, and blue, as will be apparent to those skilled in the art. For blending purposes, each color channel of each character pixel is modified using the corresponding color channel feature color ratio of a corresponding person pixel.

A feature color delta is determined for each channel value of each character pixel. The determination of a feature color delta depends on whether the feature color ratio for the corresponding person pixel is positive or negative.

For positive feature color ratios, a lightening character pixel delta is multiplied by the feature color ratio. The lightening character pixel delta is the difference between the saturation value of the color channel, and the color channel value for the character pixel. Thus, the feature color delta is:

(lightening character pixel delta)×feature color ratio.

For negative feature color ratios, a darkening character pixel delta is multiplied by the feature color ratio. The darkening character pixel delta is the color channel value of the character pixel. Thus, the feature color delta is:

(darkening character pixel delta)×feature color ratio.

Note, the feature color delta is positive for positive feature color ratios, and negative for negative feature color ratios. In addition, feature color deltas are preferably determined for each character pixel, for each of the three color channels. Thus, feature color deltas are determined for the red color channel, the blue color channel, and the green color channel.

The feature color delta is then added to the color channel value of the character pixel. It should be borne in mind that for negative feature color deltas the color channel value is reduced. This is repeated for each of the three color channel values for each character pixel.

Finally, in operation 310, the blended character image is used to represent the user in the visual chat session. Because of the use of color ratios for altering the character image, the character image essentially retains all textures while still allowing the user's features to be blended into the character image.

Figure 13:
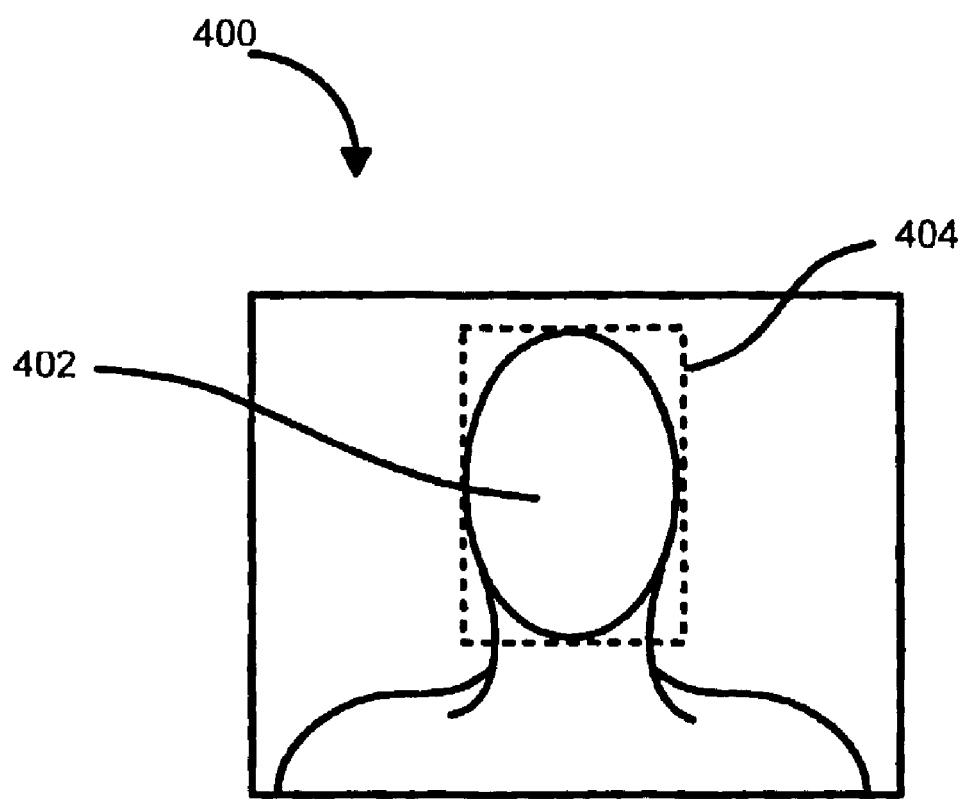
FIG. 13 is an illustration showing an image of a user with a head portion being tracked, in accordance with another embodiment of the present invention.

To determine the location of a user's features, the present invention tracks the user's head and face. FIG. 13 is an illustration showing an image 400 of a user with a head portion 402 being tracked, in accordance with another embodiment of the present invention. The image 400 includes a head portion 402 of the user, and a head tracking box 404. In use, the present invention tracks the head portion 402 of the user and surrounds the head portion 402 with the head tracking box 404. Details of head tracking are discussed in detail in U.S. patent application Ser. No. 09/364, 869, filed Jul. 30, 1999 on behalf of Jeffrey Layne Edwards, entitled System, Method And Article Of Manufacture For Tracking A Head Of A Camera-Generated Image Of A Person, which is incorporated herein by reference in its entirety.

Figure 14:
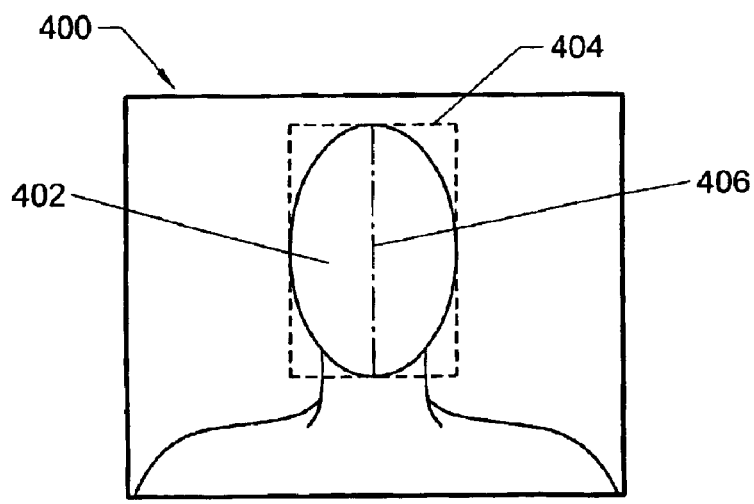
FIG. 14 is an illustration showing the image of the user including a line of symmetry, in accordance with an embodiment of the present invention.

FIG. 14 is an illustration showing the image 400 of the user including a line of symmetry 406, in accordance with an embodiment of the present invention. The image 400 includes the head portion 402 of the user, the head tracking box 404, and a line of symmetry 406. The line of symmetry 406 is a line representing the center of the user's face.

Figure 15:
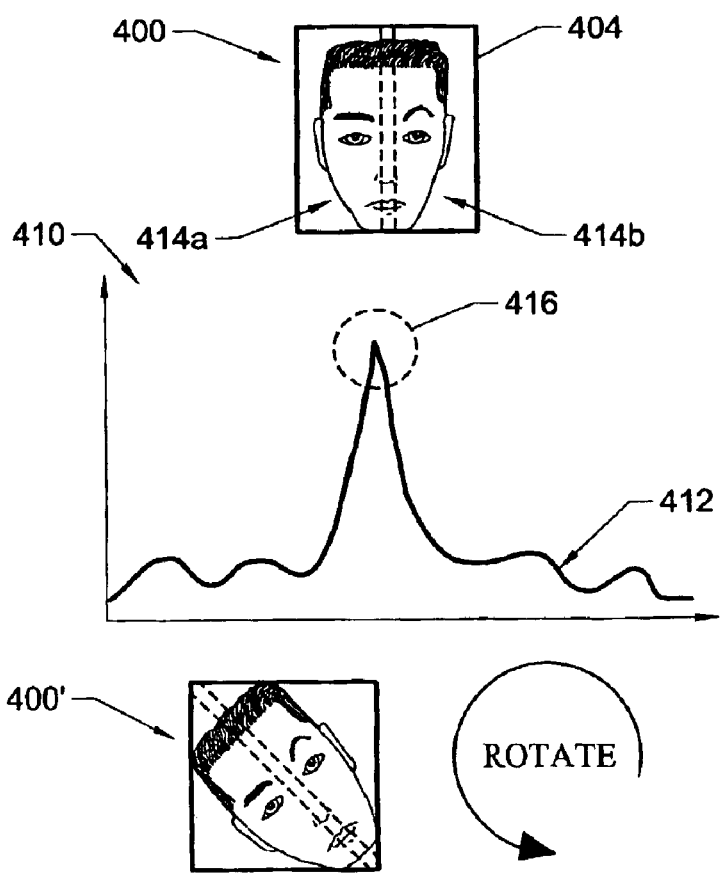
FIG. 15 is an illustration showing a graph of symmetry test locations, in accordance with one aspect of the present invention.

FIG. 15 is an illustration showing a graph 410 of symmetry test locations 412. In determining the line of symmetry 406, the image 400 of the user is divided into two head sections 414*a* and 414*b*. The head sections 414*a* and 414*b* are preferably processed using a Gaussian filter and a Laplacian filter. Next, the processed head sections 414*a* and 414*b* are mathematically overlaid to determine the best line of symmetry 406. When charted on graph 410, the best line of symmetry 406 is located at the highest peak 416 on the graph 410. The same approach is utilized to determine the line symmetry 406 when the user's image is rotated, as in 400'. Thus, the line of symmetry 406 is determined by the present invention regardless of the head tilt of the user in the video images.

Figure 16:
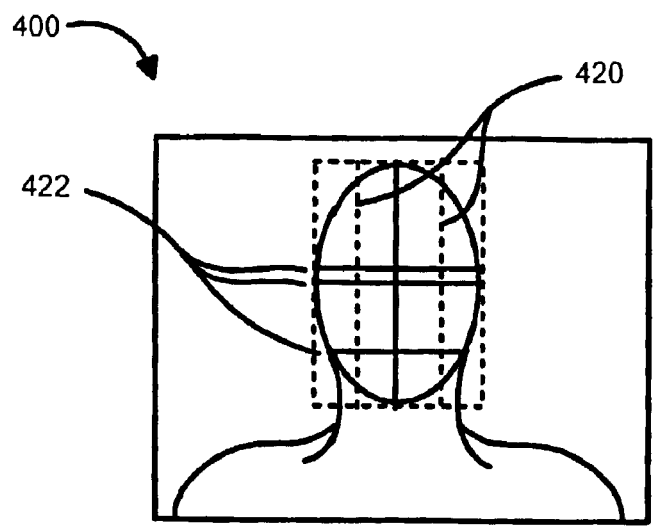
FIG. 16 is an illustration showing the image of the user including feature sample lines, and feature lines, in accordance with an embodiment of the present invention.

FIG. 16 is an illustration showing the image 400 of the user including feature sample lines 420, and feature lines 422, in accordance with an embodiment of the present invention. Each feature sample line is preferably parallel to the line of symmetry 406, and is about as long as the tracking box. Each feature line is preferably perpendicular to the line of symmetry 406.

Figure 17:
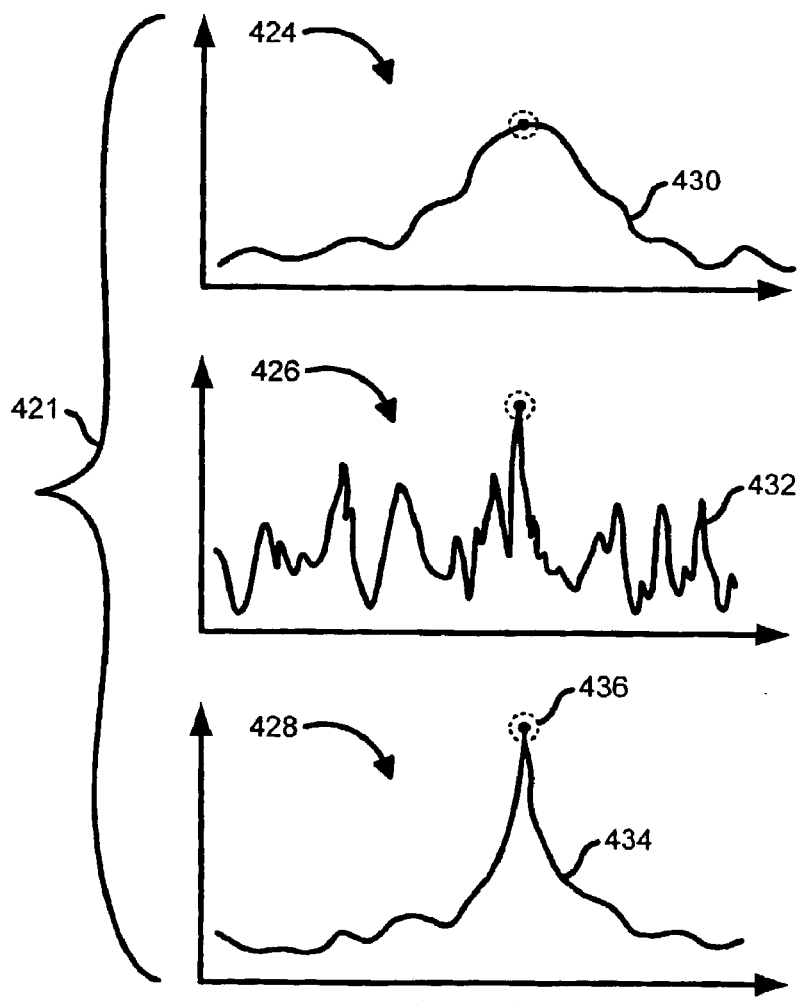
FIG. 17 is an illustration showing results along the feature sample lines, in accordance with an embodiment of the present invention.

FIG. 17 is an illustration showing results 423 along the feature sample lines 420, in accordance with an embodiment of the present invention. The results 421 include a Gaussian graph 424, a Laplacian graph 426, and a product graph 428. The Gausian graph 424 includes Gaussian results 430 from applying a Gaussian filter to the user's image along a feature sample line 420. The Laplacian graph 426 includes Laplacian results 432 from applying a Laplacian filter to the user's image along a feature sample line 420. Finally, the product graph 428 includes product results 434 from multiplying together the Gaussian results 430 and the Laplacian results 432.

After tacking the user's head portion, locations of the feature sample lines 420 are determined. The Gaussian result 430 and the Laplacian result 432 along each feature sample 420 line are multiplied together to obtain the product results 434. The dark feature areas of the user's eyes and mouth create feature peaks 436 in the product results 434. The location of the feature lines 422 are then determined to be the locations of the feature peaks 436 in the product graph 428.

Figure 18:
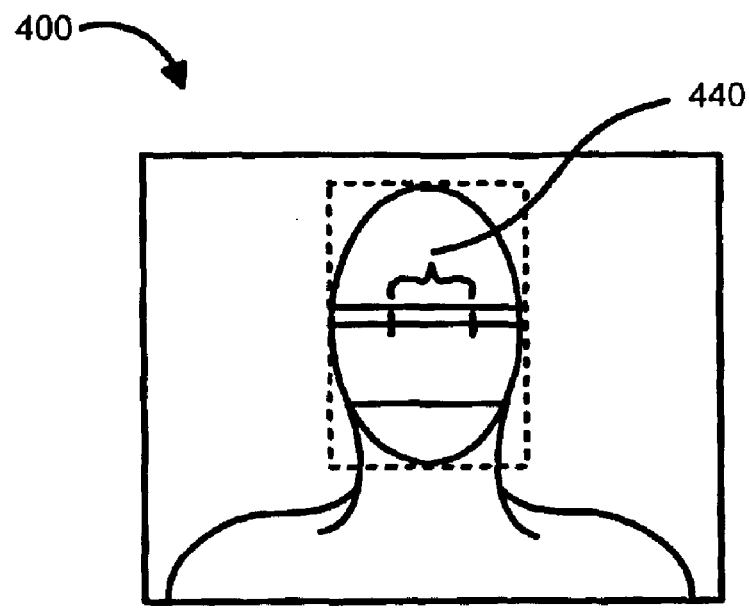
FIG. 18 is an illustration showing the image of the user including the interocular spacing, in accordance with an embodiment of the present invention.

FIG. 18 is an illustration showing the im age 400 of the user including the interocular spacing 440, in accordance with an embodiment of the present invention.

The feature line 422 corresponding to the user's eye location is termed the "ocular feature line." The interocular spacing 440 is the distance between the center of the eyes along the ocular feature line. This distance is made symmetric about the line of symmetry and used to determine the location of the user's eyes.

Figure 19:
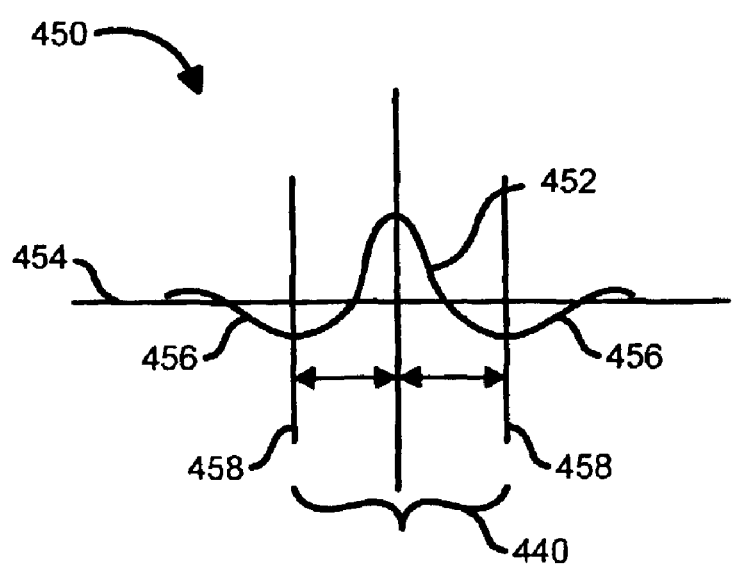
FIG. 19 is a graph showing the interocular spacing of a user, in accordance with an aspect of the present invention.

FIG. 19 is a graph 450 showing the interocular spacing 440 of a user, in accordance with an aspect of the present invention. To determine the interocular spacing 440, a Gaussian curve 452 is sampled along the ocular feature line. An average value 454 is then computed for the Gaussian curve 452. The user's eyes create ocular wells 456 below the average value 454 of the Gaussian curve 452. A weighted average 458 is then determined for each ocular well 456. The linear distance between the weighted averages is the ocular spacing 440. This distance is then made symmetric about the line of symmetry 406 to determine the location of the center of the user's eyes in the video images.

Figure 20:
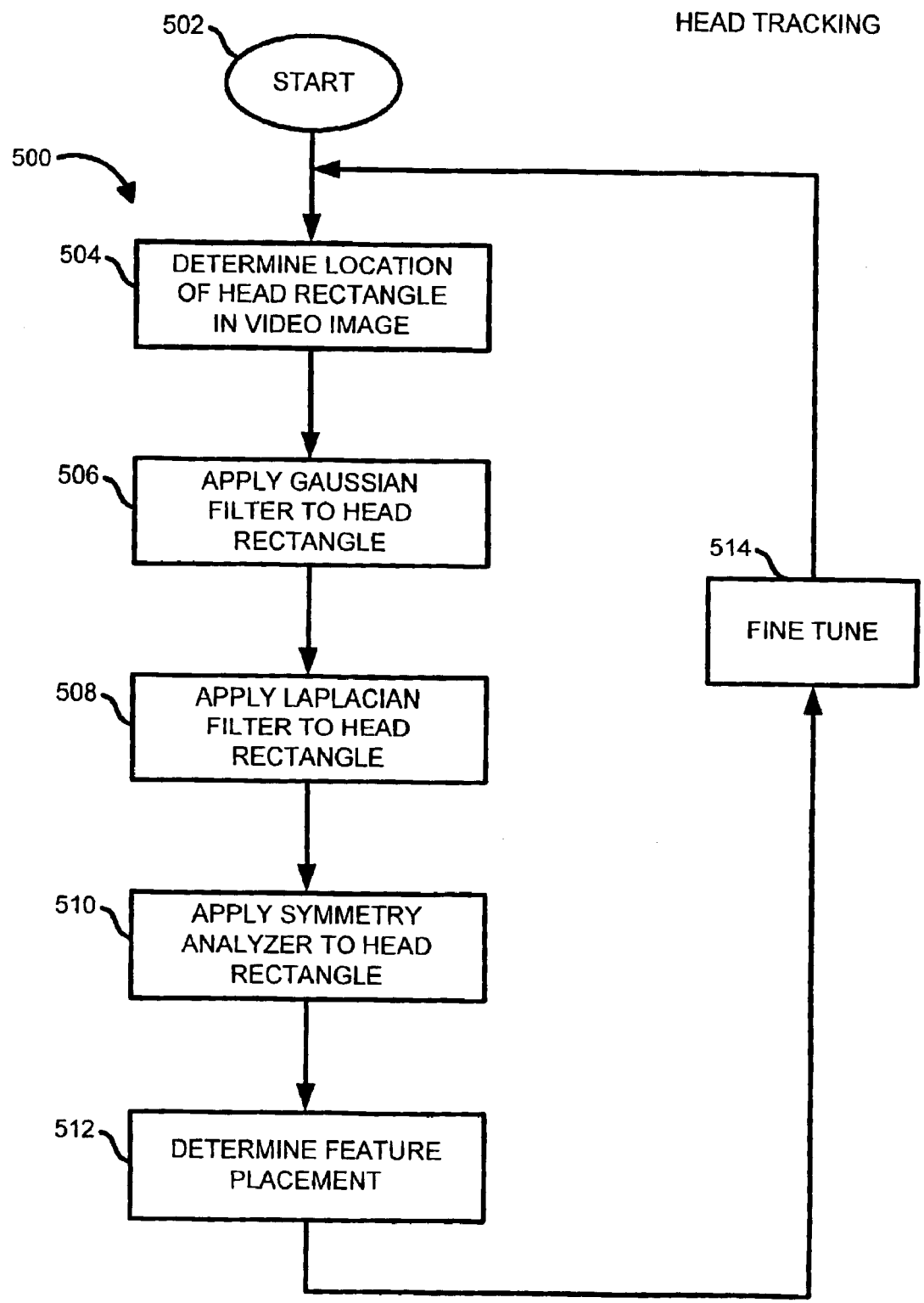
FIG. 20 is a flowchart showing a method for tracking the user's face, in accordance with one aspect of the present invention.

Referring next to FIG. 20, a method 500 for tracking the user's face is shown, in accordance with one aspect of the present invention. The method 500 begins with an initial operation 502, wherein pre-process operations are performed. Pre-process operations include obtaining video images of a user, and initializing the visual chat.

In a head tracking operation 504, the head portion of a user's image is tracked, and the location of the head rectangle is determined. Details of head tracking are discussed in detail in U.S. patent application Ser. No. 09/364,859, filed Jul. 30, 1999 on behalf of Jeffrey Layne Edwards, entitled System, Method And Article Of Manufacture For Tracking A Head Of A Camera-Generated Image Of A Person, which is incorporated herein by reference in its entirety.

In a blurring operation 506, a blurring filter is applied to the user's image within the head rectangle. Preferably, the blurring filter is a wide aperture Gaussian filter. The wide aperture Gaussian filter blurs the head portion of the person image.

Next in a sharpening operation 508, a sharpening filter is applied to the user's image within the head rectangle. Preferably, the sharpening filter is a Laplacian filter. The Laplacian filter sharpens the head portion of the person image.

A symmetry analyzer is then applied to the processed head image, in a symmetry operation 510. The symmetry analyzer determines a line of symmetry that defines the center of the user's face. In determining the line of symmetry, the image of the user is divided into two head sections. Next, the two head sections are mathematically overlaid to determine the best location of symmetry. When charted on graph, the best location of symmetry is at the highest peak on the graph. The same approach is utilized to determine the line symmetry when the user's image is rotated, as in. Thus, the line of symmetry is determined by the present invention regardless of the head tilt of the user in the video images. Further details on determining the line of symmetry can be found in "Practical Real-Time Imaging Stereo Matcher", by H. K. Nishihara, Optical Engineering (September/October 1984), incorporated herein by reference in its entirety.

In a feature placement operation 512, the locations of the user's features within the video image are determined. After determining the feature locations, the system is able to accurately sample the feature locations to obtain images of the user's features, such as the user's eyes and mouth. These feature images can then be blended in a character image for the visual chat session.

Finally, in a fine tune operation 514, the tracking results are transmitted back into the system to help in continued face tracking efforts. In this manner, the accuracy of the face tracking is improved over time.

Figure 21:
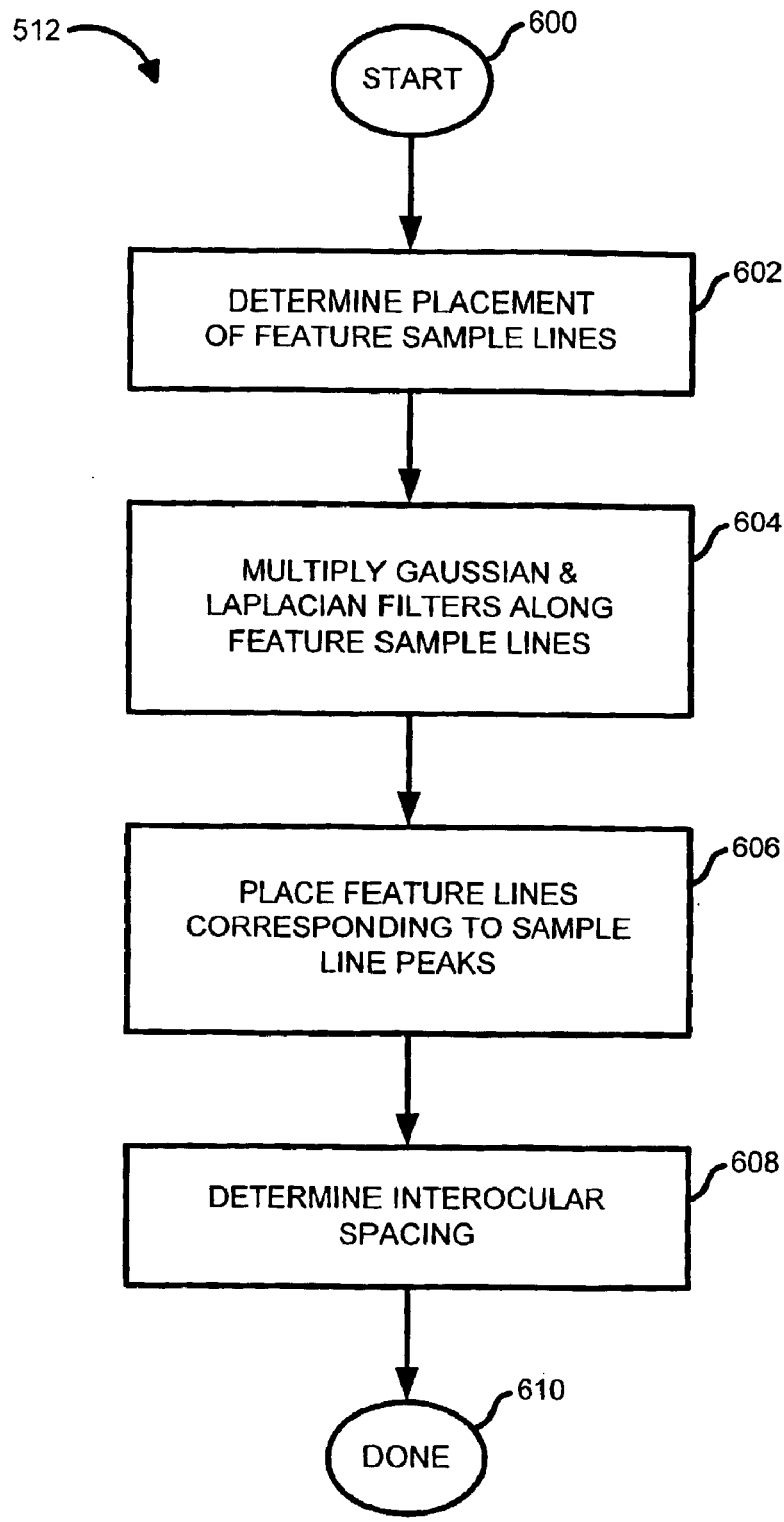
FIG. 21 is a flowchart showing a method for determining feature placement, in accordance with another embodiment of the present invention.

FIG. 21 is a flowchart showing a method 512 for determining feature placement, in accordance with another embodiment of the present invention. The method 512 begins with an initial operation 600 in which various pre-process operations are performed. Pre-process operations include determining the location of the head and determining the line of symmetry for the face.

In a sample line operation 602, the location of feature sample lines is determined. Preferably, the feature sample lines are located parallel to, and made symmetric around, the line of symmetry. The feature sample lines are used to determine the location of the feature lines.

Next, in a product operation 604 a Gaussian result and a Laplacian result are multiplied along the feature sample lines. After the locations of feature sample lines are determined, a Gaussian result and a Laplacian result along each feature sample line are multiplied together to obtain product results along each feature sample line.

In a feature placement operation 606, feature lines are located along the feature sample lines. The dark feature areas of the user's eyes and mouth create feature peaks in the product results along each feature sample line. These feature peaks are therefore used to determine the location of the feature lines. Thus, the feature lines are located at the locations of the feature peaks in the product graph for each feature sample line.

The interocular spacing is then determined, in an interocular spacing operation 608. The interocular spacing is the distance between the center of the user's eyes in the video images. After determining the interocular spacing, the user's eyes can then be accurately sampled from the user's video image.

Finally, in operation 610, the system utilizes the features lines and interocular spacing to sample the user's features from the video images and blend them into the character image.

Figure 22:
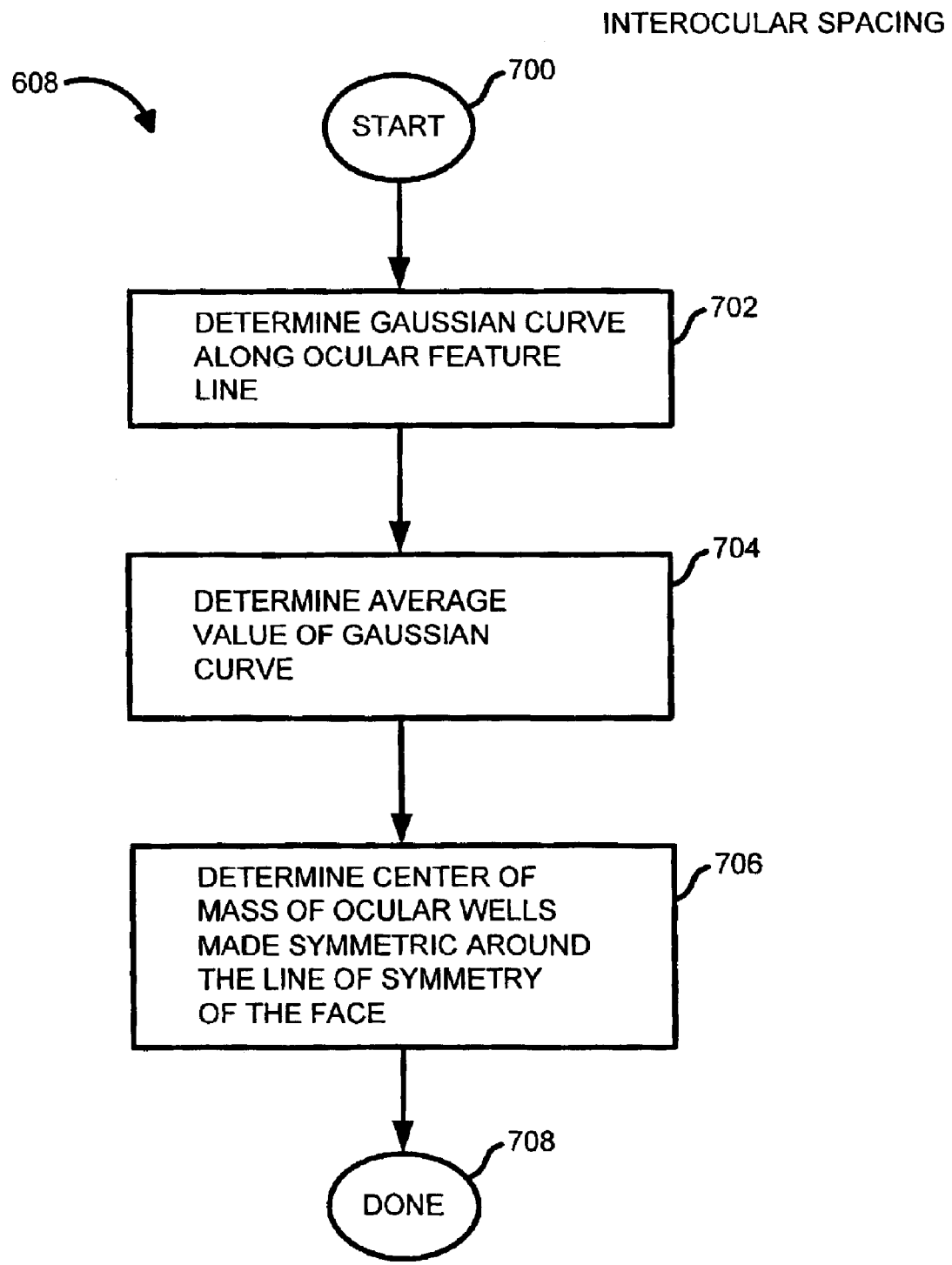
FIG. 22 is a flowchart showing a method for determining interocular spacing, in accordance with one aspect of the present invention.

Turning next to FIG. 22, a method 608 for determining interocular spacing is shown, in accordance with one aspect of the present invention. The interocular spacing is the distance between the center of the eyes along the ocular feature line. This distance is made symmetric about the line of symmetry and used to determine the location of the user's eyes. In an initial operation 700, various pre-process operations are performed. Pre-process operations include determining the location of a line of symmetry for the user's face and determining the location of feature lines.

In a Gaussian curve operation 702, a Gaussian curve is determined along an ocular feature line. The feature line corresponding to the user's eye location is termed the "ocular feature line." A Gaussian curve is sampled along this ocular feature line. The Gaussian curve may be generated anew or sampled from the previous Gaussian filter applied to the head rectangle, as described above.

An average value is then computed for the Gaussian curve, in an averaging operation 704. The average value is used to determine the location of the eyes along the ocular feature line, as described subsequently.

Next, in a weighting operation 706, the center of mass of each ocular well is determined. The user's eyes create ocular wells below the average value of the Gaussian curve, while the user's nose creates a peak along the Gaussian curve. The ocular wells are used to determine the location of the user's eyes in the video image, by way of weighted averages. A weighted average is determined for each ocular well located below the average value of the Gaussian curve. The linear distance between the determined weighted averages is the ocular spacing. This distance is then made symmetric about the line of symmetry to determine the location of the center of the user's eyes in the video images.

Finally, in operation 708, the interocular spacing is then used by the system to sample the user's eyes in the video images. It should be borne in mind that the ocular spacing preferably always made symmetric around the line of symmetry. In this manner, movement of the user's eyes does not affect the tracked eye location. Since both eyes move in the same manner, the distance between the darkest points of the eyes, i.e., the pupils, remains essentially constant.

While the present invention has been described in terms of several preferred embodiments, there are many alterations, permutations, and equivalents, which fall within the scope of this invention. It should also be noted that there are many alternative ways of implementing the methods and apparatuses of the present invention. It is therefore intended that the following appended claims be interpreted as including all such alteration, permutations, and equivalents as fall within the true spirit and scope of the present invention.

What is claimed is:

1. A method for providing a visual chat session, the method comprising the operations of:
   reading a character image into memory;
   receiving video images including image data of a person, wherein the video images include a plurality of video frames;
   tracking a portion of a person image in the video images;
   executing an image gathering operation for obtaining a portion of the person image; and
   executing an influencing operation for influencing the character image utilizing the obtained portion of the person image;
   wherein the portion of the person image is obtained from a head portion of the person image, and wherein the influencing operation includes a blending operation comprising the operation of:
   blending the obtained portion of the person image into the character image to create a blended character image, wherein the blended character image includes features corresponding to features of the person image; the features of the blended character image change as the features of the person change; and at least one feature of the blended character comprises the obtained portion of the person image.

2. A method as recited in claim 1, wherein the process of tracking the portion of the person image includes the operations of:
   determining a basic location of the head portion of the person image;
   processing the head portion of the person image;
   determining a line of symmetry for the head portion; and
   determining the location of features within the head portion.

3. A method as recited in claim 1, further comprising the operations of:
   receiving audio signals; and
   processing the audio signals, whereby the audio signals may be processed to correspond to the character image.

4. A computer system for providing a visual chat session, the computer system suitable for use in a distributed computing environment, the computer system comprising:
   a computer processor;
   memory for storing a character image;
   a camera for obtaining video images including image data of a person, wherein the video images include a plurality of video frames; and
   logic embodied on a computer readable medium, including computer executable instructions for:
   tracking a head portion of a person image in the video images;
   obtaining a portion of the person image, wherein the portion of the person image is obtained from the head portion of the person image; and
   blending the portion of the person image into the character image, wherein the blended character image includes features corresponding to features of the person image, the features of the blended character image change as the features of the person change, and at least one feature of the blended character comprises the obtained portion of the person image.

5. A computer system as recited in claim 4, wherein the computer executable instructions for tracking the head portion comprises:
   logic for determining a basic location of the head portion of the person image;
   logic for processing the head portion of the person image;
   logic for determining a line of symmetry for the head portion; and
   logic for determining the location of features within the head portion.

6. A computer system as recited in claim 4, further comprising:
   a microphone capable of transmitting audio signals; and
   logic to process the transmitted audio signals, whereby the audio signals may be processed to correspond to the character image.

7. A computer program embodied on a computer readable medium for providing a visual chat session, the computer program comprising:
   a character input code segment that reads a character image into memory;

a video code segment that receives video images including image data of a person, wherein the video images include a plurality of video frames;

a tracking code segment that tracks a head portion of a person image in the video images;

a gathering code segment that obtains a portion of the person image, wherein the portion of the person image is obtained from the head portion of the person image; and a blending code segment that blends the portion of the person image into the character image, wherein the blended character image includes features corresponding to features of the person image, the features of the blended character image change as the features of the person change, and at least one feature of the blended character comprises the obtained portion of the person image.

8. A computer program as recited in claim 7, wherein the tracking code segment comprises:

a head locating code segment for determining a basic location of the head portion of the person image;

a processing code segment for processing the head portion of the person image;

a symmetry code segment for determining a line of symmetry for the head portion; and a feature locating code segment for determining the location of features within the head portion.

9. A computer program as recited in claim 7, further comprising:

a code segment that receives audio signals; and a code segment that processes the audio signals, whereby the audio signals may be processed to correspond to the character image.

* * * * *